United States Patent
Ma et al.

(10) Patent No.: US 8,169,798 B2
(45) Date of Patent: May 1, 2012

(54) SYNCHRONOUS RECTIFIER CIRCUIT AND MULTI-OUTPUT POWER SUPPLY DEVICE USING THE SAME

(75) Inventors: Chang-su Ma, Yongin-si (KR);
Jee-hoon Jung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 604 days.

(21) Appl. No.: 12/034,140

(22) Filed: Feb. 20, 2008

(65) Prior Publication Data
US 2008/0309162 A1    Dec. 18, 2008

(30) Foreign Application Priority Data
Jun. 14, 2007    (KR) .................. 10-2007-0058581

(51) Int. Cl.
*H02M 3/335*    (2006.01)
(52) U.S. Cl. ..................... 363/21.06; 363/127
(58) Field of Classification Search ............... 363/21.06, 363/84, 89, 125–127
See application file for complete search history.

(56) References Cited

U.S. PATENT DOCUMENTS

| | | | | |
|---|---|---|---|---|
| 5,986,911 A | * | 11/1999 | Tang | 363/89 |
| 6,038,150 A | * | 3/2000 | Yee et al. | 363/89 |
| 6,912,138 B2 | * | 6/2005 | Perry et al. | 363/21.06 |
| 7,345,896 B2 | * | 3/2008 | Dalal | 363/21.14 |
| 7,688,602 B2 | * | 3/2010 | Hu | 363/21.14 |
| 2004/0130922 A1 | * | 7/2004 | Perry et al. | 363/127 |
| 2006/0072349 A1 | * | 4/2006 | Lin | 363/21.06 |

OTHER PUBLICATIONS

Chinese Office Action mailed Mar. 5, 2012 issued in corresponding Chinese Patent Application No. 200810086766.0.

* cited by examiner

*Primary Examiner* — Adolf Berhane
(74) *Attorney, Agent, or Firm* — Staas & Halsey LLP

(57) ABSTRACT

A synchronous rectifier circuit and a multi-output power supply device using the same include a semiconductor switch to control a current flow of the synchronous rectifier circuit, and a switching controller to control the semiconductor switch according to a synchronous rectification control signal and an output control signal generated by feeding back the output voltage of the synchronous rectifier circuit. The synchronous rectifier circuit can control an output voltage, decrease power loss so as to increase the efficiency of the synchronous rectifier circuit, and decrease the cost of the synchronous rectifier circuit.

20 Claims, 9 Drawing Sheets

SYNCHRONOUS RECTIFIER CIRCUIT AND MULTI-OUTPUT POWER SUPPLY DEVICE USING THE SAME

CROSS-REFERENCE TO RELATED APPLICATION

This application claims the benefit of Korean Application No. 2007-58581, filed Jun. 14, 2007 in the Korean Intellectual Property Office, the disclosure of which is incorporated herein by reference.

BACKGROUND OF THE INVENTION

1. Field of the Invention

Aspects of the present invention relate to a synchronous rectifier circuit and a multi-output power supply device using the same, and more particularly, to a synchronous rectifier circuit capable of controlling an output voltage and a multi-output power supply device using the same.

2. Description of the Related Art

Image forming apparatuses such as computers, printers, and photocopiers, and devices such as monitors and communication terminals require a high-efficiency power supply system that can supply stable power while having a simple and compact structure. Such high-efficiency power supply system generally employs a power supply device with multiple outputs that produces multiple voltage outputs using a single transformer with multiple-windings.

FIG. 1 illustrates a typical multi-output power supply device using a synchronous rectifier circuit, and FIG. 2 illustrates a typical multi-output power supply device using a secondary side post regulator (SSPR) circuit. The circuits illustrated in FIGS. 1 and 2 are also referred to as a flyback converter, which is a kind of a DC/DC converter.

Referring to FIG. 1, the typical multi-output power supply device includes a transformer T having a primary coil L1 and two secondary coils, that is, first and second coils L2 and L3, which respectively have predetermined turn ratios with the primary coil L1. The primary coil L1 of a primary side of the transformer T is coupled to a primary circuit 10. The first coil L2 of a secondary side of the transformer T is coupled to a first output circuit 20. The second coil L3 of the secondary side of the transformer T is coupled to a second output circuit 30, which is a synchronous rectifier circuit.

The primary circuit 10 includes a control switch S serially connected between the primary coil L1 of the transformer T and a ground terminal. As such, the control switch S can switch an input voltage Vi' in response to a control signal received from a primary switching controller 15 so as to control an energy charging or transferring operation of the transformer T.

The first output circuit 20 includes a rectifier 21 for rectifying a current transferred from the transformer T, and the rectifier 21 comprises a diode D1 and a capacitor C1 connected in series to the first coil L2 of the secondary side of the transformer T. An output terminal of the rectifier 21 is formed across the capacitor C1, and thus, an external load can be connected in parallel with the capacitor C1.

The second output circuit 30 comprises a semiconductor switch Q and a capacitor C2 connected in series to the second coil L3 of the secondary side of the transformer T. The semiconductor switch Q repeatedly conducts (allows flow of current) and non-conducts (prevents flow of current) according to a synchronous rectification (SR) control signal used to perform synchronous rectification. Another output terminal is formed across the capacitor C2, and thus, an external load can be connected in parallel with the capacitor C2.

The primary switching controller 15 applies a control signal for controlling a duty rate of the control switch S. Such a control signal is generated by feeding back of an output voltage $V_o1'$ of the first output circuit 20. As such, output voltages of the typical multi-output power supply device can be controlled by controlling the operation of the control switch S.

However, the output voltages of the typical multi-output power supply device illustrated in FIG. 1 is controlled through a single controller, that is, the primary switching controller 15. As such, cross regulation of the first and second output circuits 20 and 30 becomes a problem. That is, the output voltages $V_o1'$ and $V_o2'$ of the first and second output circuits 20 and 30, respectively, cannot be independently controlled. To solve this problem, the typical multi-output power supply device using a secondary side post regulator (SSPR) circuit, as illustrated in FIG. 2, was proposed.

Referring to FIG. 2, the typical multi-output power supply device includes the SSPR circuit as the second output circuit 40 comprising a diode D2, a semiconductor switch Q', and a capacitor C2 connected in series to the second coil L3 of the secondary side of the transformer T. The diode D2 and the capacitor C2 perform a rectification operation and the semiconductor switch Q' controls the output voltage $V_o2'$ in response to an output control signal (SSPR control signal) generated by feeding back of the output voltage of the second output circuit 40. The typical multi-output power supply device using the SSPR circuit illustrated in FIG. 2 additionally includes the diode D2 for rectification. As such, power loss due to a voltage drop by the diode D2 occurs to decrease the efficiency of the circuit and increase the cost of the circuit.

SUMMARY OF THE INVENTION

Aspects of the present invention provide a synchronous rectifier circuit capable of controlling an output voltage to reduce power loss, increase the efficiency of the circuit, and reduce the cost of the circuit. Aspects of the present invention also provide a multi-output power supply device using a synchronous rectifier circuit capable of controlling an output voltage to reduce power loss, increase the efficiency of the circuit, and reduce the cost of the circuit.

According to an aspect of the present invention, there is provided a synchronous rectifier circuit including a semiconductor switch to control a current flow of the synchronous rectifier circuit, and a switching controller to control the semiconductor switch according to a synchronous rectification control signal and an output control signal generated by feeding back the output voltage of the synchronous rectifier circuit.

According to an aspect of the present invention, the switching controller may include a bipolar junction transistor and control the semiconductor switch using a signal output from an emitter of the bipolar junction transistor. The synchronous rectification control signal may be input to a base of the bipolar function transistor, and the output control signal may be input to a collector of the bipolar junction transistor.

According to an aspect of the present invention, the semiconductor switch may include a metal-oxide semiconductor field effect transistor (MOSFET), and the emitter of the bipolar junction transistor may be connected to a gate of the MOSFET.

According to an aspect of the present invention, the synchronous rectifier circuit may further include a capacitor connected to the semiconductor switch, and an output terminal to output the output voltage is formed across the capacitor.

According to an aspect of the present invention, the synchronous rectifier circuit may further include a synchronous rectification control signal generator to generate the synchronous rectification control signal.

According to an aspect of the present invention, the synchronous rectification control signal generator may generate the synchronous rectification control signal through self-exciting synchronous rectification or external-exciting synchronous rectification.

According to an aspect of the present invention, the synchronous rectifier circuit may further include an output control signal generator with a feedback of the output voltage to generate the output control signal.

According to another aspect of the present invention, there is provided a multi-output power supply device including a transformer; a first output circuit to generate a first output voltage from among voltage transferred to a secondary side of the transformer; and a second output circuit to generate a second output voltage from among the voltage transferred to the secondary side of the transformer, wherein the second output circuit includes a semiconductor switch to control a current flow of the second output circuit, and a switching controller to control the semiconductor switch according to a synchronous rectification control signal and an output control signal generated by feeding back the second output voltage.

According to an aspect of the present invention, the switching controller may include a bipolar junction transistor and control the semiconductor switch using a signal output from an emitter of the bipolar junction transistor. The synchronous rectification control signal may be input to a base of the bipolar function transistor, and the output control signal may be input to a collector of the bipolar junction transistor.

According to an aspect of the present invention, the semiconductor switch may include a metal-oxide semiconductor field effect transistor (MOSFET), and the emitter of the bipolar junction transistor may be connected to a gate of the MOSFET.

According to an aspect of the present invention, the second output circuit may further include a capacitor connected to the semiconductor switch, and an output terminal to output the second output voltage may be formed across the capacitor.

According to an aspect of the present invention, the multi-output power supply device may further include a synchronous rectification control signal generator to generate the synchronous rectification control signal.

According to an aspect of the present invention, the synchronous rectification control signal generator may generate the synchronous rectification control signal through self-exciting synchronous rectification or external-exciting synchronous rectification.

According to an aspect of the present invention, the multi-output power supply device may further include an output control signal generator with a feedback of the output voltage to generate the output control signal.

According to an aspect of the present invention, a primary circuit of the transformer may include a switch to switch an input voltage in response to a control signal generated by feeding back the first output voltage.

According to an aspect of the present invention, a synchronous rectifier circuit to produce an output voltage includes a semiconductor switch to control flow of current and a value of the output voltage of the synchronous rectifier circuit; and a switching controller to control the semiconductor switch by applying a synchronous rectification (SR) control signal and an output control signal thereto, wherein the SR control signal is used to control the flow of the current and the output control signal is used to control the value of the output voltage during the flow of the current.

According to an aspect of the present invention, a multi-output power supply device includes a transformer to transfer an input voltage; a first output circuit to generate a first output voltage using the input voltage and including a first coil; and a second output circuit to generate a second output voltage using the input voltage and including a second coil, a semiconductor switch to control flow of current and a value of the second output voltage of the second output circuit, and a switching controller to control the semiconductor switch by applying a synchronous rectification (SR) control signal and an output control signal thereto, wherein the SR control signal is used to control the flow of the current and the output control signal is used to control the value of the second output voltage during the flow of the current.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
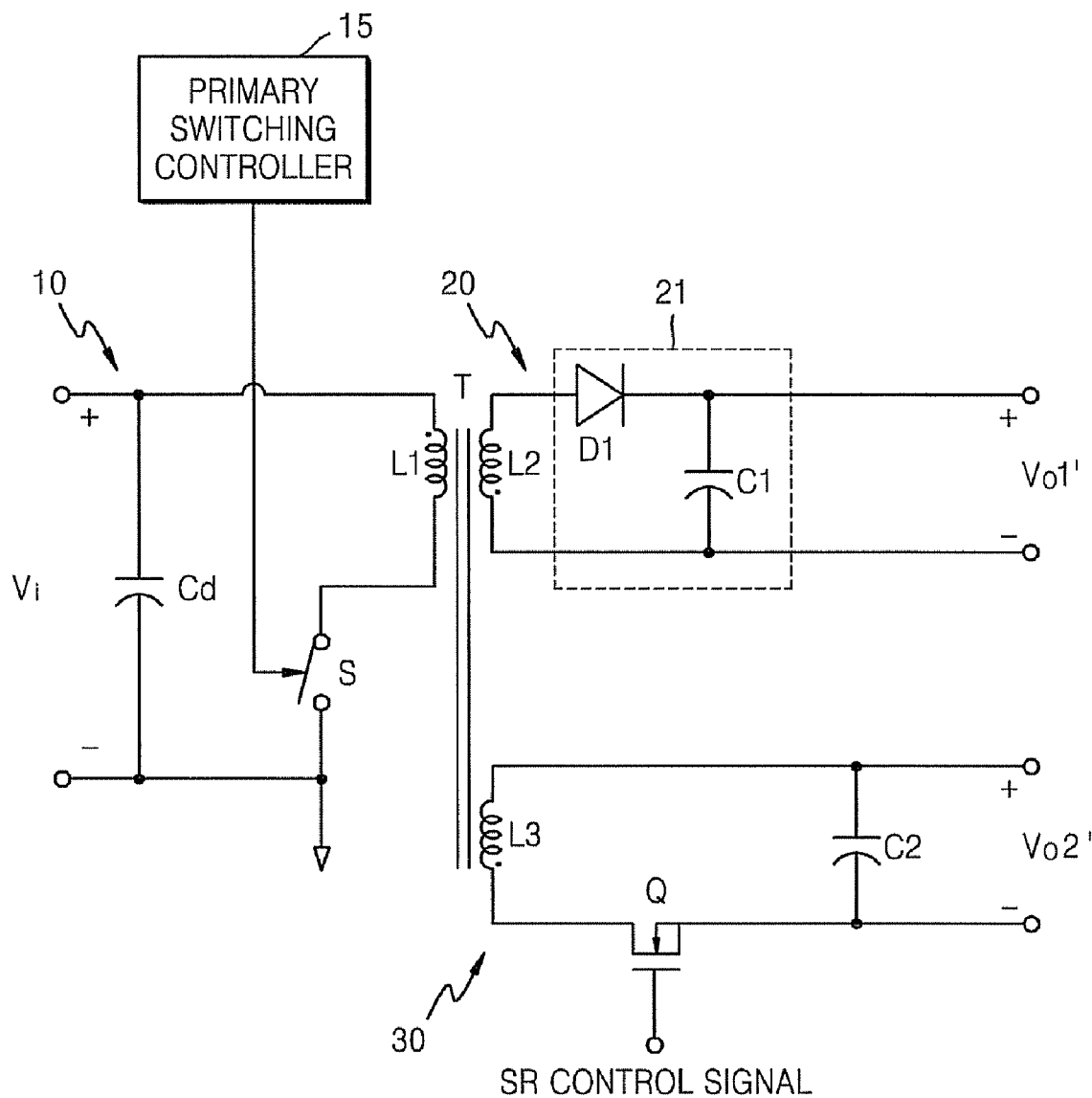
FIG. 1 illustrates a typical multi-output power supply device using a synchronous rectifier circuit.

Reference will now be made in detail to the aspects of the present invention, examples of which are illustrated in the accompanying drawings, wherein like reference numerals refer to the like elements throughout. The aspects are described below in order to explain the present invention by referring to the figures.

Figure 3:
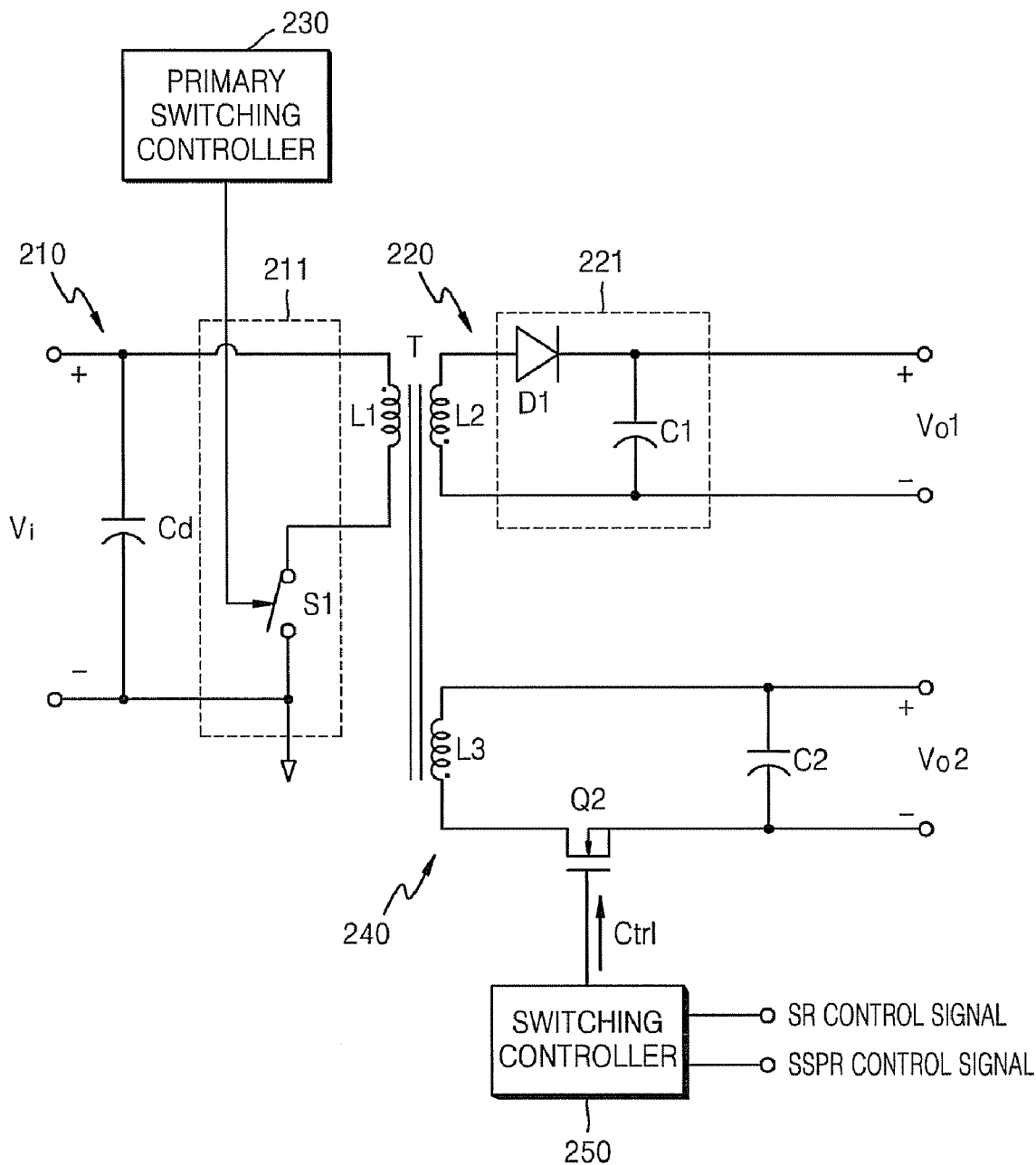
FIG. 3 illustrates a multi-output power supply device using a synchronous rectifier circuit according to an aspect of the present invention.

FIG. 3 illustrates a multi-output power supply device using a synchronous rectifier circuit according to an aspect of the present invention. Although the power supply device is shown with two outputs in this aspect, the present invention is not limited thereto, and the multi-output power supply device can have N (N being a natural number) number of outputs. If the multi-output power supply device has N number of outputs, a transformer of the multi-output power supply device also includes N number of secondary coils respectively connected to output circuits on a secondary side of the transformer.

Referring to FIG. 3, the multi-output power supply device includes a transformer T having a primary coil L1 and two secondary coils. The two secondary coils are a first coil L2 and a second coil L3 which respectively have predetermined turn ratios with the first primary coil L1. The primary coil L1 is connected to a primary circuit 210, the first coil L2 of the secondary side of the transformer T is connected to a first output circuit 220, and the second coil L3 of the secondary side of the transformer T is connected to a second output circuit 240. The primary circuit 210 is insulated from the first and second output circuits 220 and 240 of the secondary side by the transformer T. The second output circuit 240 is a synchronous rectifier circuit that can control an output voltage of the second output circuit 240, as described below.

The primary circuit 210 includes a control switch S1 serially connected between the primary coil L1 of the transformer T and a ground terminal. The control switch S1 switches an input voltage in response to a control signal received from a primary switching controller 230 so as to control an energy charging or transferring operation of the transformer T. The primary switching controller 230 applies the control signal that controls a duty rate of the control switch S1. The control signal can be generated by feeding back the output voltage of the first output circuit 220.

The first output circuit 220 includes a rectifier 221 for rectifying a current transferred from the transformer T. The rectifier 221 comprises a diode D1 and a capacitor C1 connected in series to the first coil L2 of the secondary side of the transformer T. An output terminal for outputting an output voltage $V_o1$ is formed across the capacitor C1. That is, an external load can be connected in parallel with the capacitor C1.

The second output circuit 240 includes a semiconductor switch Q2 and a capacitor C2 connected in series to the second coil L3 of the secondary side of the transformer T, and a switching controller 250 for controlling the semiconductor switch Q2. The semiconductor switch Q2 controls a current flow of the second output circuit 240, and the semiconductor switch Q2 is controlled by the switching controller 250 according to a received synchronous rectification (SR) control signal, and a received output control signal (hereinafter referred to as an SSPR control signal) generated by feeding back an output voltage $V_o2$ of the second output circuit 240. Also, the switching controller 250 controls the semiconductor switch Q2 to conduct (allows flow of current) and non-conduct (prevents flow of current) according to the SR control signal so that synchronous rectification is performed and controls a voltage drop of the semiconductor switch Q2 according to the SSPR control signal to achieve regulation of the output voltage $V_o2$ of the second output circuit 240.

Figure 4:
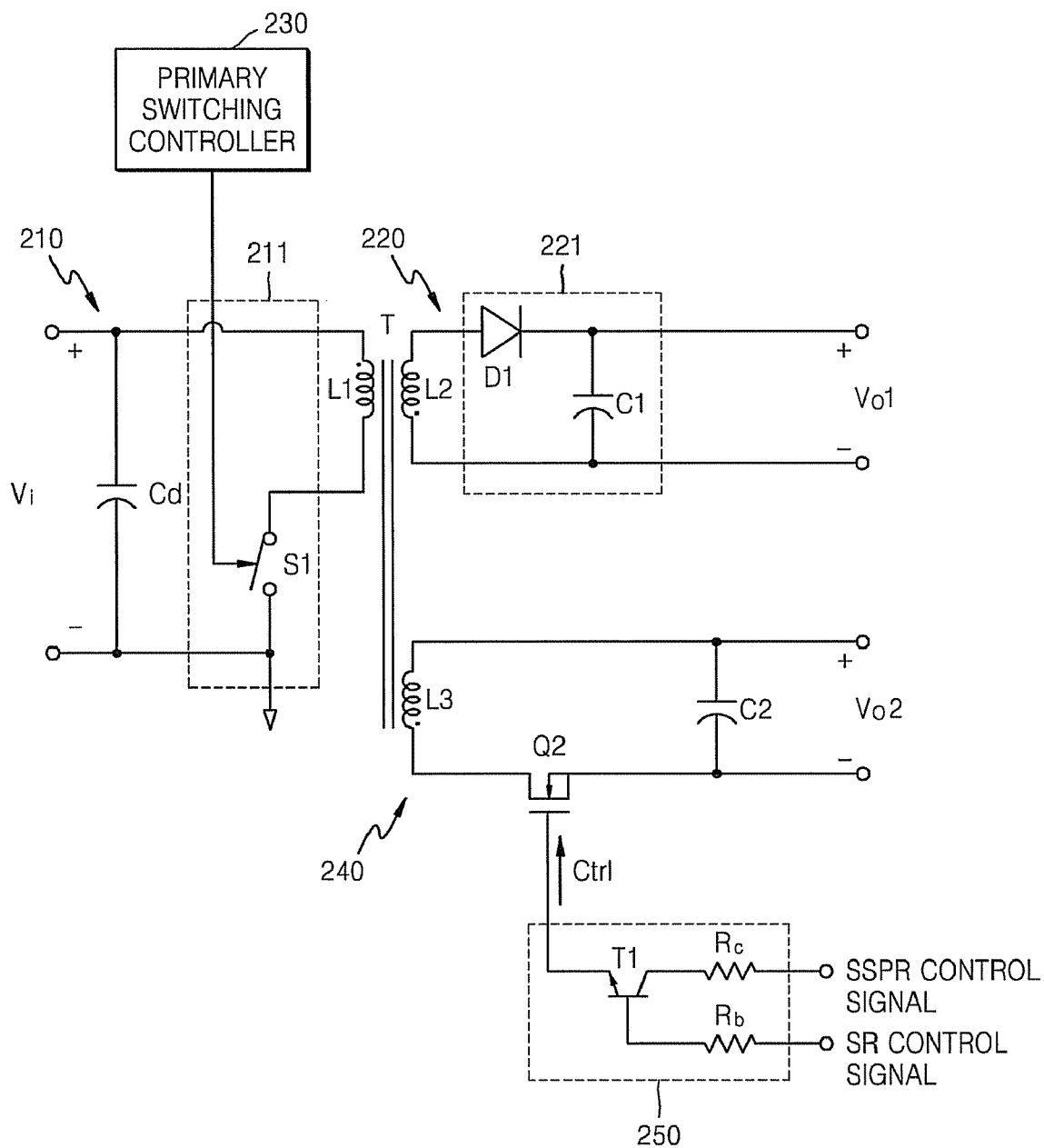
FIG. 4 is a circuit diagram of the multi-output power supply device illustrated in FIG. 3.

FIG. 4 is a circuit diagram of the multi-output power supply device illustrated in FIG. 3. In this aspect, the semiconductor switch Q2 is configured in the form of (or include) a metal-oxide semiconductor field effect transistor (MOSFET). In other aspects, other transistors are usable for the switch Q2.

Referring to FIG. 4, the switching controller 250 includes a bipolar junction transistor (BJT) T1 and resistors Rc and Rb respectively coupled to a collector and a base of the BJT T1. The SR control signal is input to the base of the BJT T1 and the SSPR control signal is applied to the collector of the BJT T1. An emitter of the BJT T1 is connected to a gate of the MOSFET Q2 such that the MOSFET Q2 is operated in response to a control signal Ctrl from the emitter of the BJT T1.

When the SR control signal is logic high, the BJT T1 is turned on. Accordingly, the SSPR control signal is output from the emitter of the BJT T1 and applied to the gate of the MOSFET Q2. When the SR control signal is logic low, however, the BJT T1 is turned off. Accordingly, the SSPR control signal is not output from the emitter of the BJT T1 and no signal is applied to the gate of the MOSFET Q2.

Figure 5A:
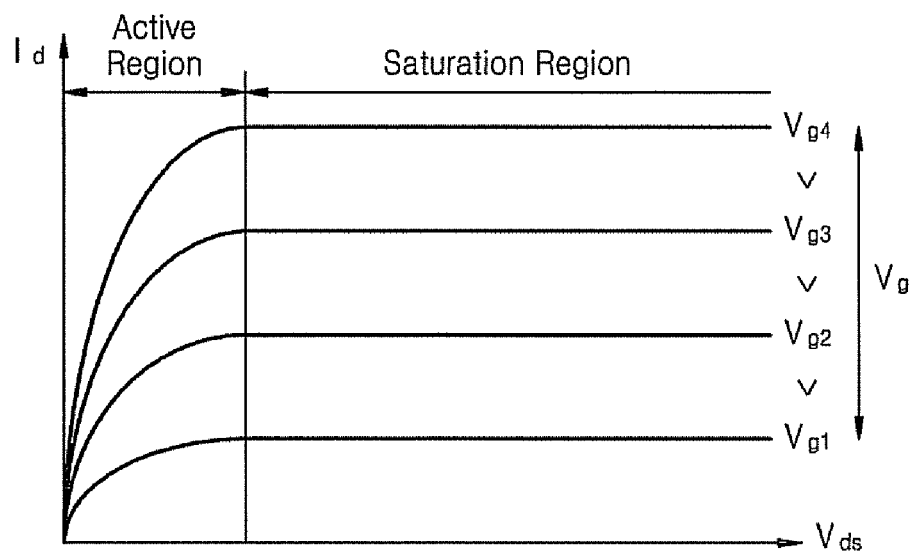
FIG. 5A is a graph showing operation characteristics of a metal-oxide semiconductor field effect transistor (MOSFET) included in the multi-output power supply device illustrated in FIG. 4 according to a voltage that is applied to the gate of the MOSFET, according to an aspect of the present invention.

FIG. 5A is a graph showing operation characteristics of the MOSFET Q2 according to a voltage Vg that is applied to the gate of the MOSFET Q2, according to an aspect of the present invention. Referring to FIG. 5A, a current Id flowing through the MOSFET Q2 according to a drain-source voltage Vds of the MOSFET Q2 depends on the voltage Vg that is applied to the gate of the MOSFET Q2. Accordingly, an equivalent resistance of the MOSFET Q2 varies with the voltage Vg that is applied to the gate of the MOSFET Q2. Therefore, the output voltage $V_o2$ of the second output circuit 240 can be controlled.

Figure 5B:
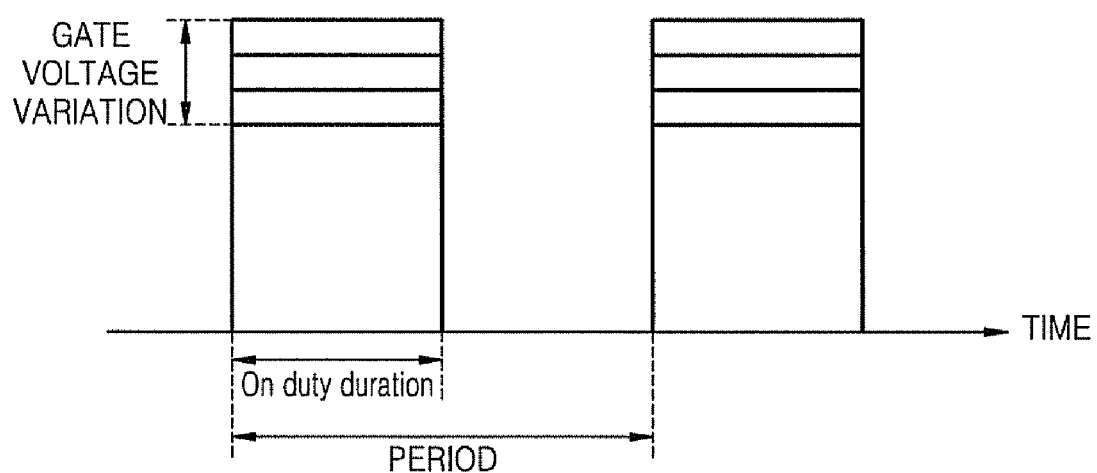
FIG. 5B is a graph showing a variation in the voltage that is applied to the gate of the MOSFET included in the multi-output power supply device illustrated in FIG. 4, which is a control signal output from an emitter of a bipolar junction transistor (BJT) included in the multi-output power supply device illustrated in FIG. 4.

FIG. 5B is a graph showing a variation in the voltage Vg that is applied to the gate of the MOSFET Q2 (that is, the control signal Ctrl output from the emitter of the BJT T1). The SR control signal Ctrl has a predetermined period. Also, the SR control signal is logic high during an on duty duration of the predetermined period and is logic low in other periods of the predetermined period. Accordingly, the BJT T1 is turned on only during the on duty duration so that the SSPR control signal is applied to the gate of the MOSFET Q2 only during the on duty duration. Meanwhile, as described above, the SSPR control signal is varied according to the output voltage $V_o2$ of the second output circuit 240. Thus, the voltage that is applied to the gate of the MOSFET Q2 is also varied according to the output voltage $V_o2$ of the second output circuit 240 during the on duty duration of the SR control signal. Accordingly, as illustrated in FIG. 4, synchronous rectification and regulation according to an output voltage variation are simultaneously achieved due to the second output circuit 240.

Figure 6:
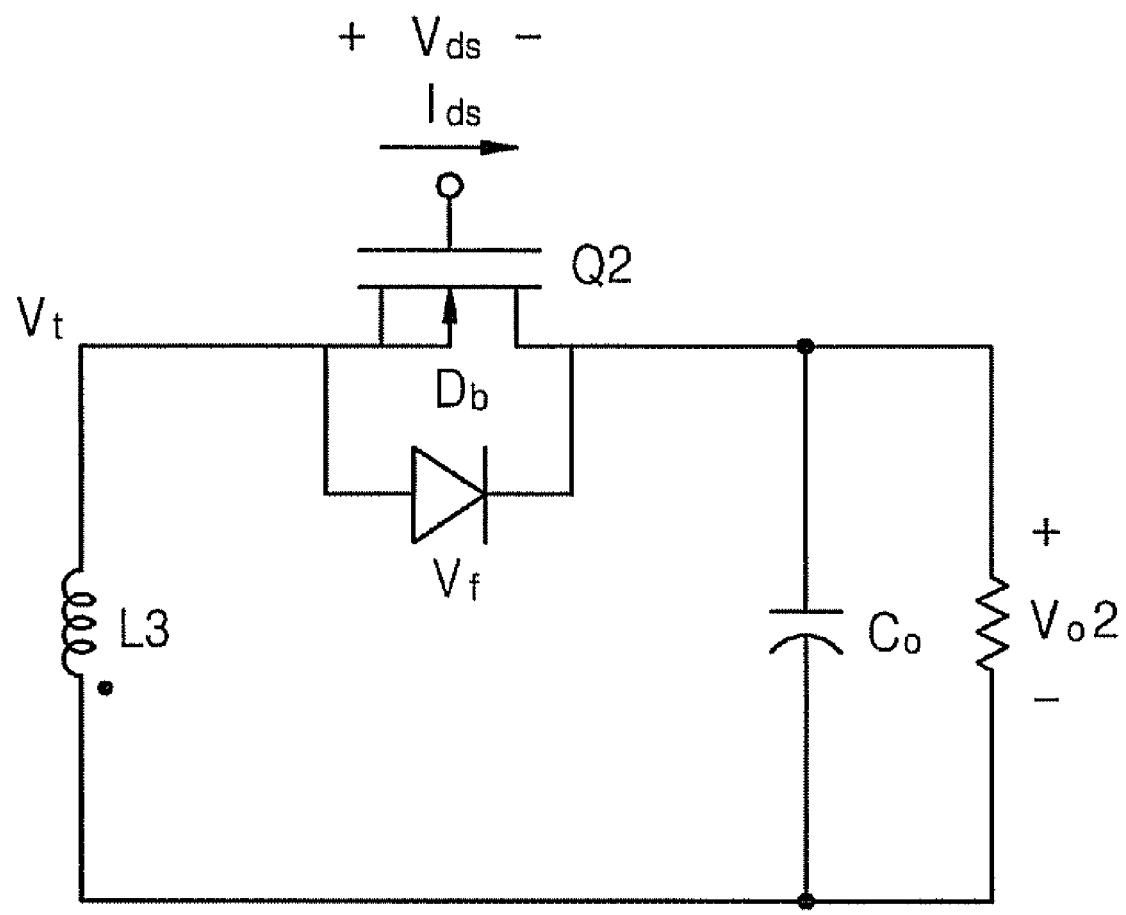
FIG. 6 is a circuit diagram for explaining the operation of a synchronous rectifier circuit according to an aspect of the present invention.

FIG. 6 is a circuit diagram for explaining the operation of the synchronous rectifier circuit according to an aspect of the present invention. Referring to FIG. 6, an output voltage Vo2 is determined by a voltage drop Vds in the MOSFET Q2 and a forward voltage reduction Vf of a an intrinsic body diode Db existing in the MOSFET Q2. Here, the forward voltage reduction Vf is a predetermined value according to characteristics of the MOSFET Q2. If the voltage drop Vds is less than or equal to the forward voltage reduction Vf, the output voltage Vo2 is determined by Equation 1.

$$Vo2 = Vt - Vds = Vt - Ids \cdot Rds \qquad \text{[Equation 1]}$$

Here, Vt denotes a node voltage between the second coil L3 and the MOSFET Q2, Ids denotes a current flowing through the MOSFET Q2, and Rds denotes an equivalent resistance between the drain and the source of the MOSFET Q2.

Accordingly, as described above with reference to FIG. 5A, the equivalent resistance Rds between the drain and the source of the MOSFET Q2 is controlled using the voltage Vg that is applied to the gate of the MOSFET Q2 to achieve regulation of the output voltage Vo2.

However, the equivalent resistance Rds of the MOSFET Q2 is varied as long as the voltage drop Vds does not exceed the forward voltage reduction Vf. On the other hand, the output voltage Vo2 is determined by the forward voltage reduction Vf according to Equation 2 when the voltage drop Vds exceeds the forward voltage reduction Vf.

$$Vo2=Vt-Vf \qquad \text{[Equation 2]}$$

Consequently, the output voltage Vo2 can be varied to Vt−Vf. That is, the output voltage Vo2 can be reduced by the forward voltage reduction Vf of.

Figure 2:
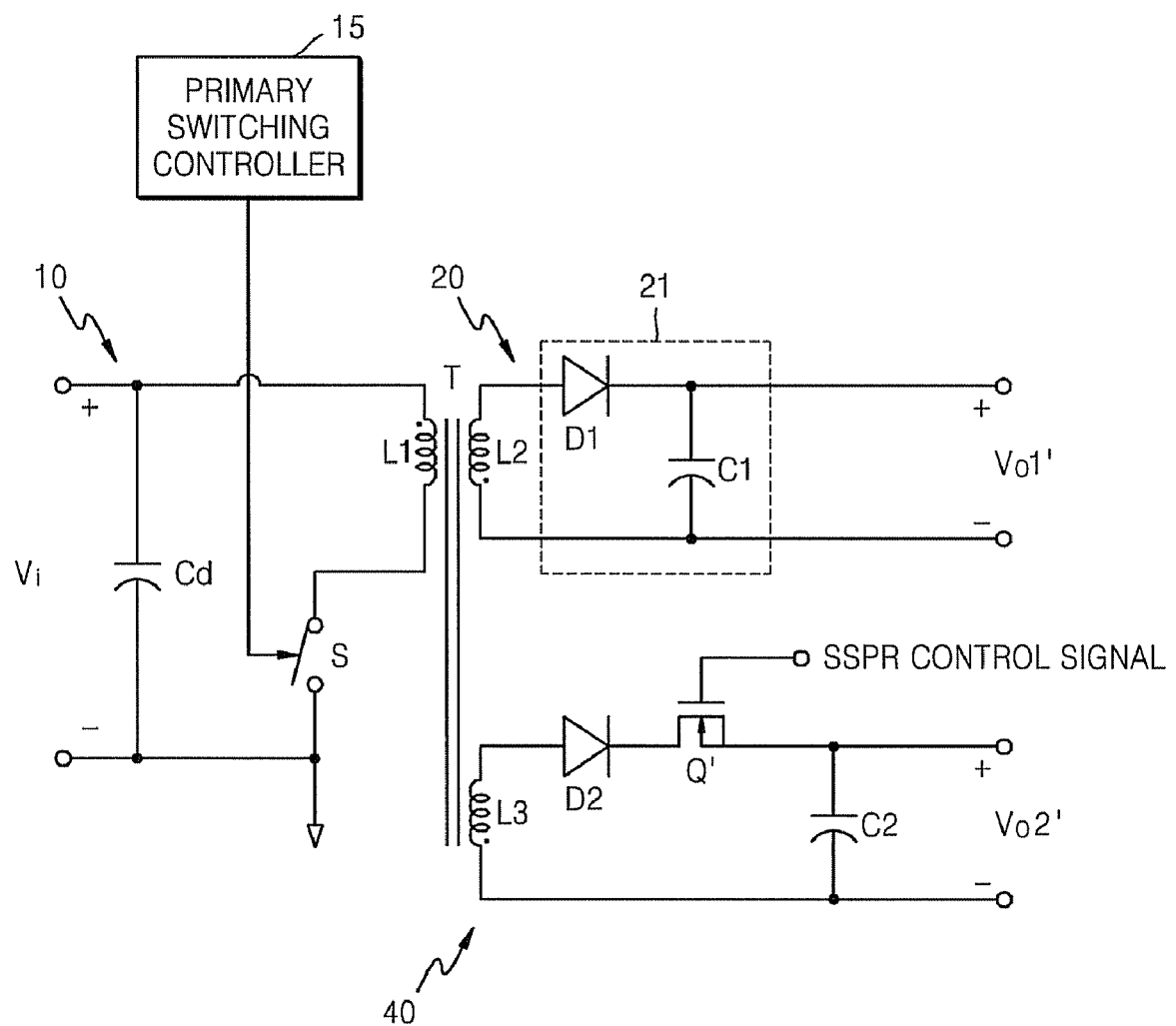
FIG. 2 illustrates a typical multi-output power supply device using a secondary side post regulator (SSPR) circuit.

With reference to FIG. 2, a comparison of the synchronous rectifier circuit of the second output circuit 240 to a typical SSPR circuit 40 will be explained. Specifically, when a forward voltage reduction of the diode D2 is Vf', a current flowing through a MOSFET Q' is Id', and the equivalent resistance of the MOSFET Q' is Rds', the output voltage Vo2' of the second output circuit 40 is determined by Equation 3.

$$Vo2'=Vt-Vf'-Id'\cdot Rds' \qquad \text{[Equation 3]}$$

The forward voltage reduction Vf of the body diode Db of a MOSFET according to an aspect of the present invention is considerably greater than a forward voltage reduction Vf' of a general power diode of FIG. 2. Accordingly, a range of reduction for the output voltage is increased when the synchronous rectifier circuit according to an aspect of the present invention is used. For example, when the output terminal of the first output circuit 220 illustrated in FIG. 4 has a maximum load and the output terminal of the second output circuit 240 has a minimum load, the voltage that is applied to the second coil L3 of the second output circuit 240 increases by the largest amount. In such cases, the output voltage Vo2 of the second output circuit 240 can be reduced by an amount up to the level of the forward voltage reduction Vf of the diode D2, and thus enable the output voltage Vo2 to be controlled within a wider range.

Furthermore, the synchronous rectifier circuit according to aspects of present invention does not use the diode D2 used in the second output circuit 40 illustrated in FIG. 2. Thus, power loss due to a voltage drop of the diode D2 does not occur. Accordingly, the efficiency of the synchronous rectifier circuit is improved as high as in a typical synchronous rectifier circuit and the cost required for the diode Db is reduced.

Figure 7:
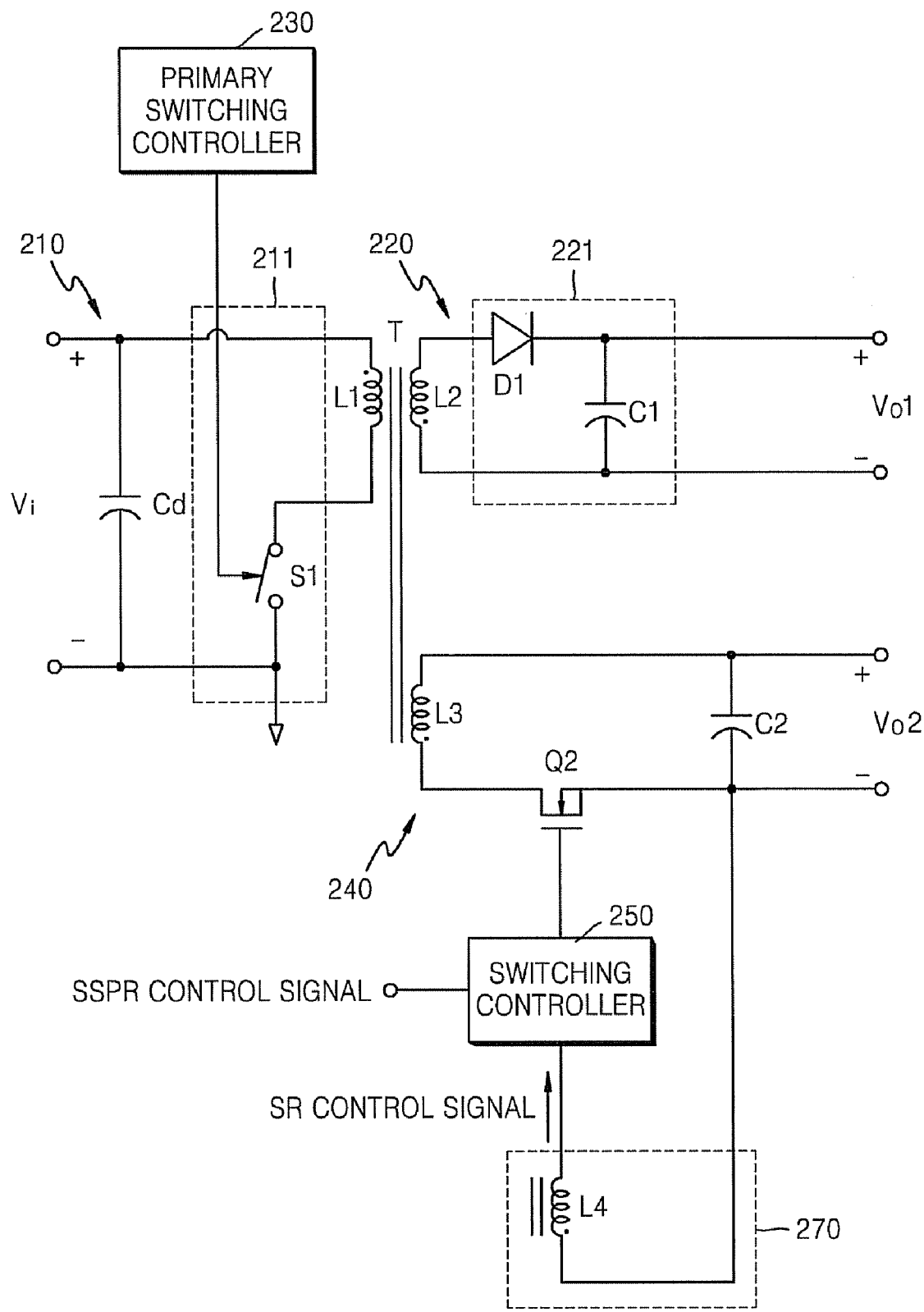
FIG. 7 illustrates a multi-output power supply device including a synchronous rectification (SR) control signal generator according to another aspect of the present invention.

FIG. 7 illustrates a multi-output power supply device including an SR control signal generator 270 according to another aspect of the present invention. The SR control signal generator 270 employs self-exciting synchronous rectification and includes a secondary coil L4 coupled electrically to the primary coil L1. The SR control signal generated from the SR control signal generator 270 is provided to the switching controller 250.

Figure 8:
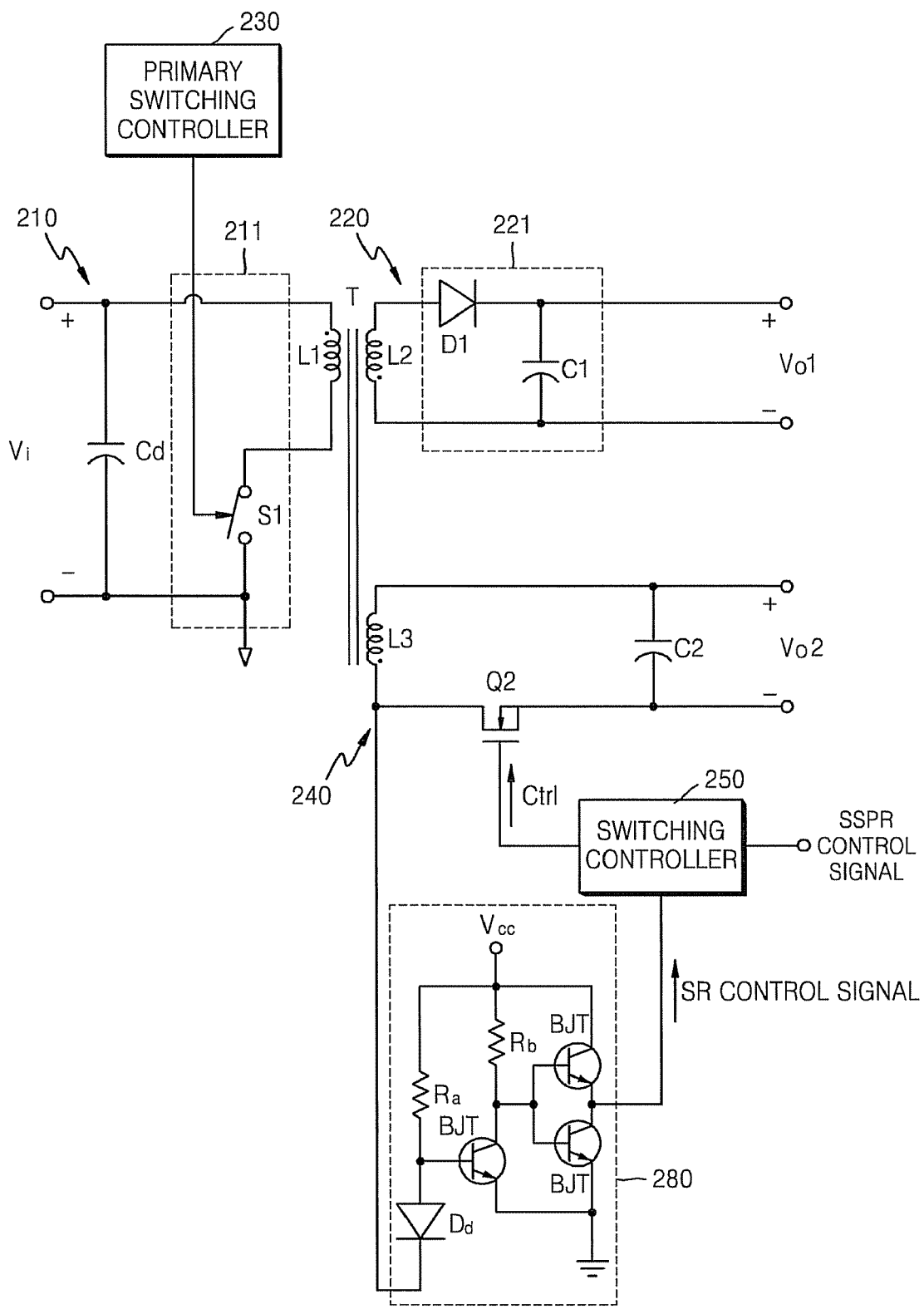
FIG. 8 illustrates a multi-output power supply device including a SR control signal generator according to another aspect of the present invention.

FIG. 8 illustrates a multi-output power supply device including an SR control signal generator 280 according to another aspect of the present invention. The SR control signal generator 280 uses external-exciting synchronous rectification and voltage driving method. The SR control signal generator 280 includes a diode Dd for polarity determination, resistors Ra and Rb, and several BJTs, which are arranged as shown in FIG. 8. The SR control signal generated from the SR control signal generator 280 is provided to the switching controller 250.

Figure 9:
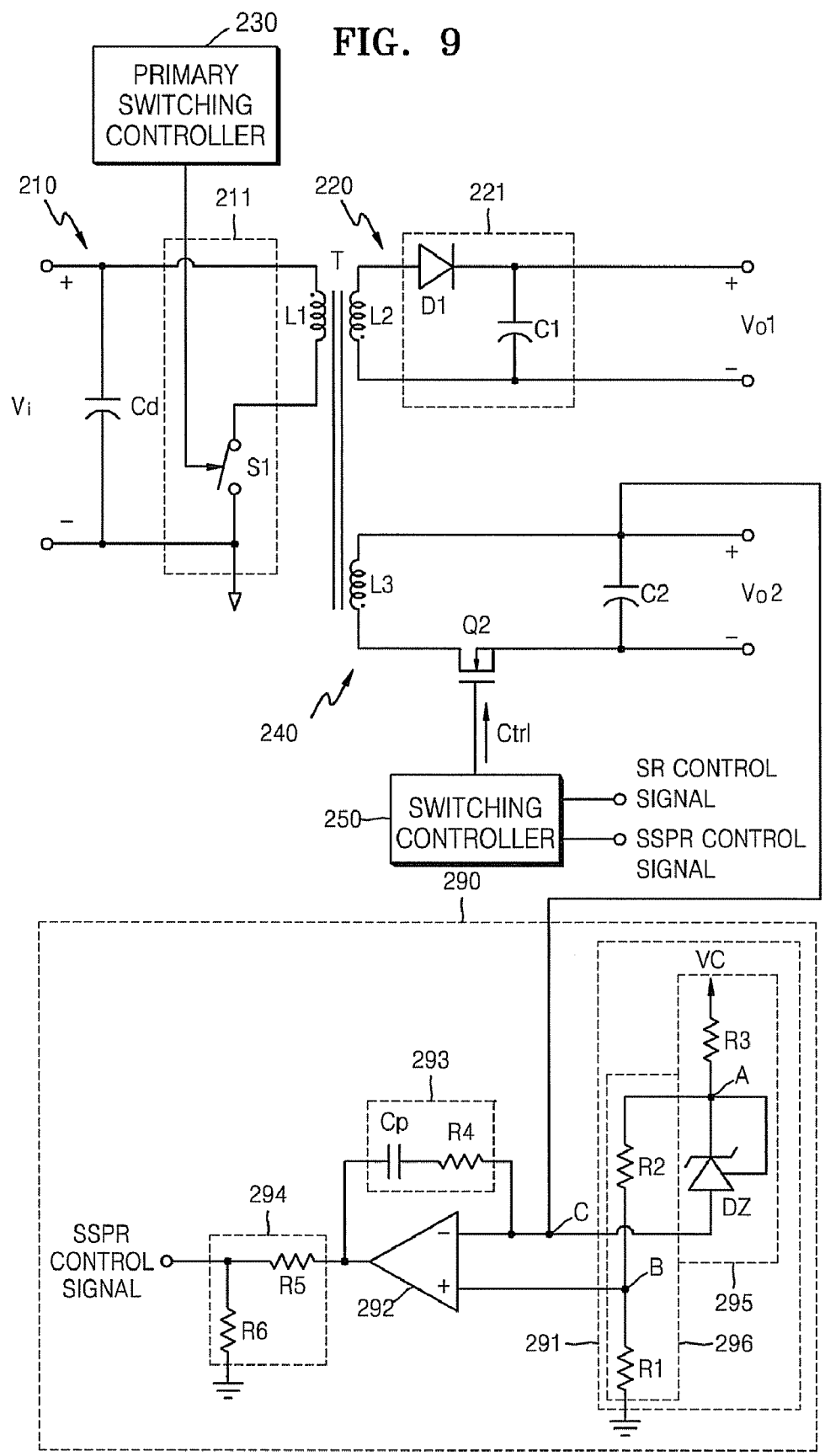
FIG. 9 illustrates a multi-output power supply device including an output control signal generator to generate a secondary side post regulator (SSPR) control signal according to another aspect of the present invention.

FIG. 9 illustrates a multi-output power supply device including an output control signal generator 290 to generate an SSPR control signal according to another aspect of the present invention. The output control signal generator 290 may include a reference voltage generator 291, an error detector 292, a compensator 293, and a control signal output unit 294.

The reference voltage generator 291 generates a reference voltage that is to be compared with the output voltage Vo2 of the second output circuit 240, and provides the reference voltage to the error detector 292. The reference voltage generator 291 may include a first reference voltage generator 295 that is connected to a predetermined power supply voltage Vc and which generates a first reference voltage. The reference voltage generator 291 may also include a voltage-divider circuit 296 for dividing the first reference voltage generated by the first reference voltage generator 295 so as to generate a second reference voltage.

The first reference voltage generator 295 includes a resistor R3 connected to the power supply voltage Vc and the zener diode DZ. The voltage-divider circuit 296 includes a first resistor R1 and a second resistor R2 used to divide the first reference voltage generated by the first reference voltage generator 295.

The second reference voltage is input to a first input terminal (+) of the error detector 292 and the output voltage Vo2 is input to a second input terminal (−) of the error detector 292. The error detector 292 compares the second reference voltage with the output voltage Vo2 and outputs a difference between the second reference voltage and the output voltage Vo2, that is, an error value. Also, the error detector 292 can be configured in the form of a comparator.

The compensator 293 provides a compensation circuit for a negative feedback so as to stabilize the circuit of the output control signal generator 290. Preferably, though such is not required is that, the compensator 293 is connected in parallel with an output terminal and the second input terminal of the error detector 292. The compensator 293 includes a fourth resistor R4 and a capacitor Cp that are serially connected to each other.

The control signal output unit 294 divides the error value output from the error detector 292 so as to output the SSPR control signal, and the control signal output unit 294 comprises a fifth resistor R5 and a sixth resistor R6 for dividing the error value output from the error detector 292.

Even though the multi-output power supply device is shown having two output circuits at the secondary side in the aforementioned aspects, it will be understood by those of ordinary skill in the art that the multi-output power supply device can have a plurality of secondary output circuits that are independently controlled.

As described above, aspects of the present invention can provide a synchronous rectifier circuit capable of controlling the output voltage and a multi-output power supply device using the same so as to decrease power loss, and thus, increase the efficiency of the synchronous rectifier circuit and decrease the cost of the synchronous rectifier circuit.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A synchronous rectifier circuit comprising:
   a semiconductor switch to control a current flow of the synchronous rectifier circuit; and
   a switching controller to control the semiconductor switch by applying an output control signal generated by feeding back the output voltage of the synchronous rectifier circuit to the semiconductor switch when a synchronous rectification control signal is high, wherein the switching controller comprises a bipolar junction transistor and controls the semiconductor switch using a signal output from an emitter of the bipolar junction transistor, the synchronous rectification control signal is input to a base of the bipolar function transistor, and the output control signal is input to a collector of the bipolar junction transistor.

2. The synchronous rectifier circuit of claim 1, wherein the semiconductor switch comprises a metal-oxide semiconductor field effect transistor (MOSFET), and the emitter of the bipolar junction transistor is connected to a gate of the MOSFET.

3. The synchronous rectifier circuit of claim 1, further comprising a capacitor connected to the semiconductor switch, and an output terminal to output the output voltage is formed across the capacitor.

4. The synchronous rectifier circuit of claim 1, further comprising a synchronous rectification control signal generator to generate the synchronous rectification control signal.

5. The synchronous rectifier circuit of claim 4, wherein the synchronous rectification control signal generator generates the synchronous rectification control signal through self-exciting synchronous rectification or external-exciting synchronous rectification.

6. The synchronous rectifier circuit of claim 1, further comprising an output control signal generator with a feedback of the output voltage to generate the output control signal.

7. A multi-output power supply device comprising:
a transformer;
a first output circuit to generate a first output voltage from a voltage transferred to a secondary side of the transformer; and
a second output circuit to generate a second output voltage from the voltage transferred to the secondary side of the transformer,
wherein the second output circuit comprises:
a semiconductor switch to control a current flow of the second output circuit; and
a switching controller to control the semiconductor switch by applying an output control signal generated by feeding back the output voltage of the synchronous rectifier circuit to the semiconductor switch when a synchronous rectification control signal is high,
wherein the switching controller comprises a bipolar function transistor and controls the semiconductor switch using a signal output from an emitter of the bipolar junction transistor, the synchronous rectification control signal is input to a base of the bipolar function transistor, and the output control signal is input to a collector of the bipolar junction transistor.

8. The multi-output power supply device of claim 7, wherein the semiconductor switch comprises a metal-oxide semiconductor field effect transistor (MOSFET), and the emitter of the bipolar junction transistor is connected to a gate of the MOSFET.

9. The multi-output power supply device of claim 7, wherein the second output circuit further comprises a capacitor connected to the semiconductor switch, and an output terminal to output the second output voltage is formed across the capacitor.

10. The multi-output power supply device of claim 7, further comprising a synchronous rectification control signal generator to generate the synchronous rectification control signal.

11. The multi-output power supply device of claim 10, wherein the synchronous rectification control signal generator generates the synchronous rectification control signal through self-exciting synchronous rectification or external-exciting synchronous rectification.

12. The multi-output power supply device of claim 7, further comprising an output control signal generator with a feedback of the output voltage to generate the output control signal.

13. The multi-output power supply device of claim 7, wherein a primary circuit of the transformer comprises a switch to switch an input voltage in response to a control signal generated by feeding back of the first output voltage.

14. A synchronous rectifier circuit to produce an output voltage, comprising:
a semiconductor switch to control flow of current and a value of the output voltage of the synchronous rectifier circuit; and
a switching controller to control the semiconductor switch by applying an output control signal generated by feeding back the output voltage of the synchronous rectifier circuit to the semiconductor switch when a synchronous rectification control signal is high,
wherein the switching controller comprises a bipolar junction transistor and controls the semiconductor switch using a signal output from an emitter of the bipolar junction transistor, the synchronous rectification control signal is input to a base of the bipolar function transistor, and the output control signal is input to a collector of the bipolar junction transistor.

15. The synchronous rectifier circuit of claim 14, wherein the switching controller generates the output control signal by using the output voltage of the synchronous rectifier circuit that is fed back to the switching controller.

16. The synchronous rectifier circuit of claim 14, wherein the output control signal controls a voltage drop of the semiconductor switch to control the value of the output voltage.

17. A multi-output power supply device comprising:
a transformer to transfer an input voltage;
a first output circuit to generate a first output voltage using the input voltage and comprising a first coil; and
a second output circuit to generate a second output voltage using the input voltage and comprising:
a second coil,
a semiconductor switch to control flow of current and a value of the second output voltage of the second output circuit, and
a switching controller to control the semiconductor switch by applying an output control signal generated by feeding back the output voltage of the synchronous rectifier circuit to the semiconductor switch when a synchronous rectification control signal is high,
wherein, when a Vt denotes a node voltage between the second coil and the semiconductor switch, a Vds denotes a voltage drop of the semiconductor switch, and a Vf denotes a forward voltage reduction of the semiconductor switch, the second output voltage Vo2 is;
Vo2=Vt−Vds, if the Vds of the semiconductor switch is less than or equal to the Vf; and
Vo2=Vt−Vf, if the Vds exceeds the Vf.

18. The multi-output power supply device of claim 17, wherein the switching controller generates the output control signal by using the second output voltage of the second output circuit that is fed back to the switching controller.

19. The multi-output power supply device of claim 17, wherein the semiconductor switch is a field effect transistor having a source, a drain, and a gate.

20. The multi-output power supply device of claim 17, wherein the first output circuit and the second output circuit are independently controlled to respectively generate the first output voltage and the second output voltage.

* * * * *